US010970291B2

(12) United States Patent
McNeela et al.

(10) Patent No.: US 10,970,291 B2
(45) Date of Patent: Apr. 6, 2021

(54) DETECTING TOPICAL SIMILARITIES IN KNOWLEDGE DATABASES

(71) Applicant: MachineVantage, Inc., Piedmont, CA (US)

(72) Inventors: Daniel Martin McNeela, Carlsbad, CA (US); Ratnakar Dev, San Rafael, CA (US); Anantha K. Pradeep, Piedmont, CA (US)

(73) Assignee: MACHINEVANTAGE, INC., Berkeley, CA (US)

( * ) Notice: Subject to any disclaimer, the term of this patent is extended or adjusted under 35 U.S.C. 154(b) by 132 days.

(21) Appl. No.: 16/165,953

(22) Filed: Oct. 19, 2018

(65) Prior Publication Data

US 2020/0050678 A1   Feb. 13, 2020

Related U.S. Application Data

(60) Provisional application No. 62/717,293, filed on Aug. 10, 2018.

(51) Int. Cl.
*G06F 16/2457* (2019.01)
*G06F 16/901* (2019.01)
*G06F 16/9535* (2019.01)
*G06Q 30/02* (2012.01)

(52) U.S. Cl.
CPC .... *G06F 16/24578* (2019.01); *G06F 16/9024* (2019.01); *G06F 16/9535* (2019.01); *G06Q 30/0201* (2013.01)

(58) Field of Classification Search
USPC ........................................................ 707/727
See application file for complete search history.

(56) References Cited

U.S. PATENT DOCUMENTS

| | | | | |
|---|---|---|---|---|
| 5,938,720 A | * | 8/1999 | Tamai | G01C 21/3446 701/411 |
| 6,868,525 B1 | * | 3/2005 | Szabo | G06Q 30/02 715/738 |

(Continued)

OTHER PUBLICATIONS

Tom Young et al., "Recent Trends in Deep Learning Based Natural Language Processing," arXiv preprint arXiv:1708.02709v8, 2018.

(Continued)

*Primary Examiner* — Cam Linh T Nguyen
(74) *Attorney, Agent, or Firm* — Kwan & Olynick LLP

(57) ABSTRACT

Provided are systems, methods, and devices for providing topical similarities in a knowledge database. A knowledge database containing a number of articles is accessed, and clickstream data for the knowledge database is obtained including aggregated counts of user clicks on links within articles in the knowledge database. The clickstream data is sorted by source article, with each source article corresponding to a number of target articles that the source article links to. A directed article graph is constructed based on the sorted clickstream data. An input search term is received from an input device, and then an unbounded graph search is performed on the directed graph based on the input search term. Finally, a ranking heuristic for a predefined number of articles in the knowledge database is provided corresponding to topical similarity of the articles to the input search term.

6 Claims, 6 Drawing Sheets

(56) References Cited

U.S. PATENT DOCUMENTS

| | | | | |
|---|---|---|---|---|
| 7,177,798 | B2* | 2/2007 | Hsu | G10L 15/18 704/10 |
| 7,181,438 | B1* | 2/2007 | Szabo | G06F 21/6245 |
| 8,571,930 | B1* | 10/2013 | Galperin | G06Q 30/0273 705/14.43 |
| 10,079,885 | B1* | 9/2018 | Chaboud | H04L 67/1097 |
| 2007/0198178 | A1* | 8/2007 | Trimby | G06N 5/003 701/533 |
| 2009/0055628 | A1* | 2/2009 | Mitran | G06F 9/3834 712/207 |
| 2009/0197686 | A1* | 8/2009 | Bergelt | A63F 13/10 463/43 |
| 2009/0248657 | A1* | 10/2009 | Chellapilla | G06F 16/951 |
| 2010/0138410 | A1* | 6/2010 | Liu | G06F 16/951 707/723 |
| 2011/0082643 | A1* | 4/2011 | Huseth | G01C 21/20 701/533 |
| 2012/0283948 | A1* | 11/2012 | Demiryurek | G01C 21/3492 701/533 |
| 2013/0144899 | A1* | 6/2013 | Lee | G06Q 50/01 707/759 |
| 2015/0032767 | A1* | 1/2015 | Gao | G06F 16/9535 707/765 |
| 2015/0310862 | A1* | 10/2015 | Dauphin | G06F 40/30 704/257 |
| 2015/0332670 | A1* | 11/2015 | Akbacak | G06F 40/40 704/9 |
| 2016/0239758 | A1* | 8/2016 | Jeong | G06F 40/30 |
| 2017/0024375 | A1* | 1/2017 | Hakkani-Tur | G10L 15/1822 |
| 2017/0148068 | A1* | 5/2017 | Akasaka | H04L 67/32 |
| 2017/0169573 | A1* | 6/2017 | Ren | G06T 7/162 |
| 2017/0243107 | A1* | 8/2017 | Jolley | G06N 5/02 |
| 2017/0249399 | A1* | 8/2017 | Hu | G06F 16/9032 |
| 2017/0293690 | A1* | 10/2017 | Malhotra | G06F 16/9535 |
| 2018/0225382 | A1* | 8/2018 | Crabtree | G06F 16/367 |
| 2018/0349499 | A1* | 12/2018 | Pawar | G06F 16/24578 |
| 2019/0034780 | A1* | 1/2019 | Marin | G06N 3/006 |

OTHER PUBLICATIONS

Yonatan Belinkov and James Glass, "Analysis Methods in Neural Language Processing: A Survey," vol. 7, pp. 49-72, 2019.

* cited by examiner

500

510

Table 1: Input term "Tea"

| Topic | Ranking |
|---|---|
| Top 20 Rankings | |
| Tea (disambiguation) | 1 |
| Tea | 2 |
| Tea (meal) | 3 |
| Oolong | 4 |
| Triethylamine | 5 |
| Health effects of Tea | 6 |
| Camellia sinensis | 7 |
| Gongfu tea ceremony | 8 |
| Oxalate | 9 |
| Theanine | 10 |
| Earl Grey tea | 11 |
| Tetraethylammonium | 12 |
| Herbal Tea | 13 |
| Kukicha | 14 |
| Yogi Tea | 15 |
| Camellia | 16 |
| Tetraethylammonium chloride | 17 |
| Black tea | 18 |
| Noon chai | 19 |
| Masala chai | 20 |

520

Table 2: Input term "Fear"

| Topic | Ranking |
|---|---|
| Top 25 Rankings | |
| Fear (disambiguation) | 1 |
| Horror and terror | 2 |
| Fear (1996 film) | 3 |
| Terror (disambiguation) | 4 |
| F.E.A.R (tv series) | 5 |
| Phobia | 6 |
| Terror (politics) | 7 |
| List of phobias | 8 |
| Anxiety | 9 |
| Terror (band) | 10 |
| Fear (band) | 11 |
| Specific phobia | 12 |
| Horror film | 13 |
| Social anxiety disorder | 14 |
| F.E.A.R. | 15 |
| Somatic anxiety | 16 |
| Amygdala | 17 |
| Fight-or-flight response | 18 |
| The Terror (disambiguation) | 19 |
| Rumination (psychology) | 20 |
| Agoraphobia | 21 |
| Horror fiction | 22 |
| Nightmare | 23 |
| Butterflies in stomach | 24 |
| The Terror (1963 film) | 25 |

DETECTING TOPICAL SIMILARITIES IN KNOWLEDGE DATABASES

CROSS-REFERENCE TO RELATED APPLICATIONS

This application claims the benefit under 35 U.S.C. § 119(e) of U.S. Provisional Patent Application No. 62/717,293, filed on Aug. 10, 2018, and titled, "Detecting Topical Similarities in Knowledge Databases," which is incorporated by reference herein in its entirety for all purposes

TECHNICAL FIELD

The present disclosure relates generally to language modeling and natural language processing, and more specifically to detecting topical similarities in knowledge databases.

BACKGROUND

In marketing, one is often tasked with generating product ideas, slogans, and innovations based on aggregated data associated with consumer behavior. Furthermore, marketers often look to generate ideas which incorporate topical and semantic relatedness to brand keys or high-level concepts. From a neurocognitive perspective, consumers are predisposed to look favorably on marketing campaigns which tap into their subconscious biases and desires.

Linguists and neurocognitive scientists occasionally use "knowledge databases" as usable datasets for language modeling, natural language processing, machine learning, and more. A knowledge database is a searchable database constituting a dataset of knowledge in written or spoken language. Knowledge databases often contain vast and sometimes comprehensive amounts of useful knowledge in searchable and accessible form. One example of a knowledge database is Wikipedia, a free online encyclopedia created and edited by volunteers around the world. The Wikipedia corpus provides a rich source of information surrounding both world knowledge and the ways in which the world's population accesses and prioritizes this knowledge.

Given this popularity, as well as the relatively transparent access to usage data, Wikipedia and similar knowledge databases can be useful avenues for marketers, neurocognitive researchers, and others to gain insight into the topical similarities of different topics, based on how users access and navigate the knowledge contained therein.

SUMMARY

Systems, methods, and devices for providing topical similarities in a knowledge database are described. A knowledge database containing a number of articles is accessed, and clickstream data for the knowledge database is obtained including aggregated counts of user clicks on links within articles in the knowledge database. The clickstream data is sorted by source article, with each source article corresponding to a number of target articles that the source article links to. A directed article graph is constructed based on the sorted clickstream data. An input search term is received from an input device, and then an unbounded graph search is performed on the directed graph based on the input search term. Finally, a ranking heuristic for a predefined number of articles in the knowledge database is provided corresponding to topical similarity of the articles to the input search term

BRIEF DESCRIPTION OF THE DRAWINGS

FIG. 5 illustrates an example of topical similarity rankings for received input terms, implemented in accordance with some embodiments.

DETAILED DESCRIPTION

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In addition, although many of the components and processes are described below in the singular for convenience, it will be appreciated by one of skill in the art that multiple components and repeated processes can also be used to practice the techniques of the present disclosure.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

In the foregoing embodiments and examples of the systems, methods, and devices provided herein, Wikipedia is often used as an example of a knowledge database. However, it should be understood that any knowledge database, text corpus, or similar organized set of knowledge, topics, articles, words, concepts, or phrases may be used.

The systems, methods, and devices provided herein are concerned with exploring knowledge graphs or article graphs in such a manner as to prioritize topical similarity. This is accomplished by incorporating clickstream statistics of one or more knowledge graphs (sometimes referred to as databases) as the basis for the metric from which a relative ranking of articles can be derived. In some implementations, clickstream data consists of aggregated counts of user clicks on links within articles in the knowledge database. Generally speaking, a clickstream is a recording of parts of the screen that a user clicks on while web browsing or using another software application.

Figure 1:
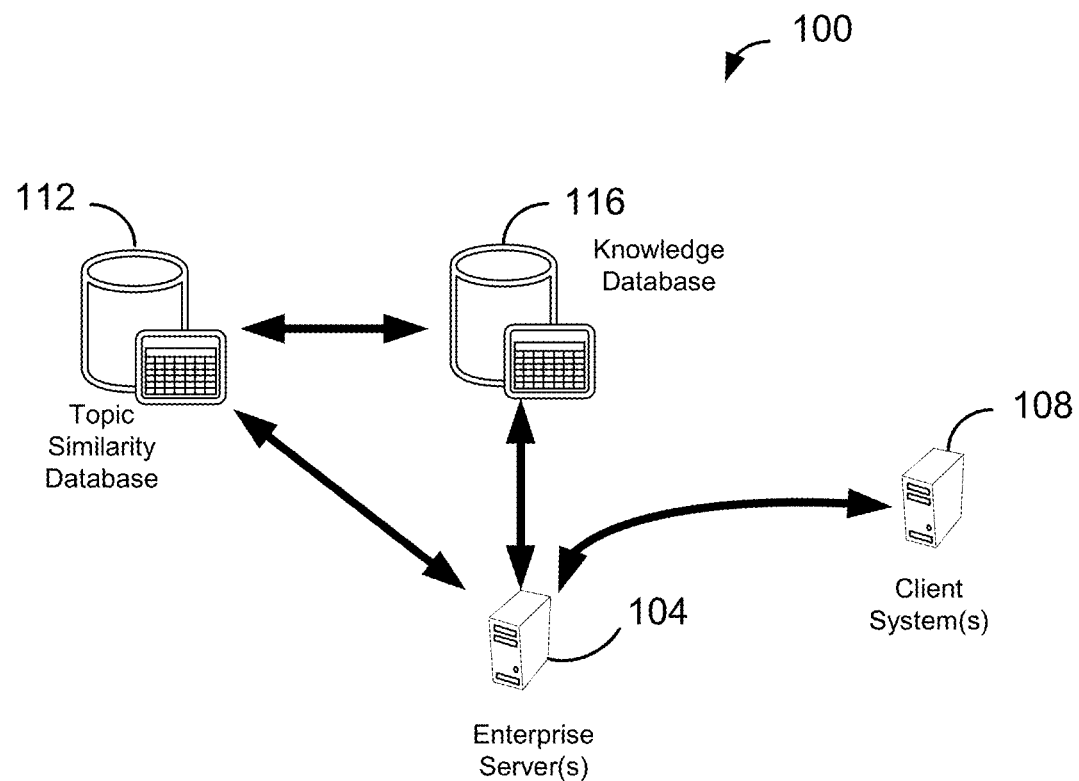
FIG. 1 shows a system diagram for detecting topical similarities in knowledge databases, configured in accordance with some implementations.

FIG. 1 shows a system diagram of an example of a system 100 for detecting topical similarities in knowledge databases, in accordance with some implementations. System 100 includes a variety of different hardware and/or software components which are in communication with each other. In the non-limiting example of FIG. 1, system 100 includes at least one enterprise server 104, at least one client system 108, at least one topic similarity database 112, and at least one knowledge database 116.

The topic similarity database 112 can be a database implemented in a relational or non-relational database management system. The topic similarity database allows for storage, maintenance, and retrieval of data, records, and/or statistics related to topic similarities within one or more knowledge databases. In some embodiments, this database can include, for example, one or more of: sorted or unsorted clickstream data for one or more knowledge databases, filtered clickstream data, one or more lists of input terms, one or more topic similarity results in tabular, graph, or similar form; numbers of users for various pieces of clickstream data; and total click counts for various pieces of clickstream data.

The knowledge database 116 can be a database implemented in a relational or non-relational database management system. This database can include one or more the contents of one or more searchable repositories of knowledge or information. For example, the knowledge database can be a Wikipedia database containing the entries, records, and/or articles constituting the Wikipedia corpus of accessible text. In some implementations, the knowledge database includes one or more pieces of clickstream data pertaining to the one or more knowledge databases.

Enterprise server 104 may communicate with other components of system 100. This communication may be facilitated through a combination of networks and interfaces. Enterprise server 104 may handle and process data requests from the client system 108. Likewise, enterprise server 104 may return a response to client system 108 after a data request has been processed. For example, enterprise server 104 may retrieve data from one or more databases, such as the topic similarity database 112 or the knowledge database 116. It may combine some or all of the data from different databases, and send the processed data to client system 108.

Client system 108 may be a computing device capable of communicating via one or more data networks with a server. Examples of client system 108 include a desktop computer or portable electronic device such as a smartphone, a tablet, a laptop, a wearable device, an optical head-mounted display (OHMD) device, a smart watch, etc. Client system 108 includes at least one browser in which applications may be deployed.

Figure 2:
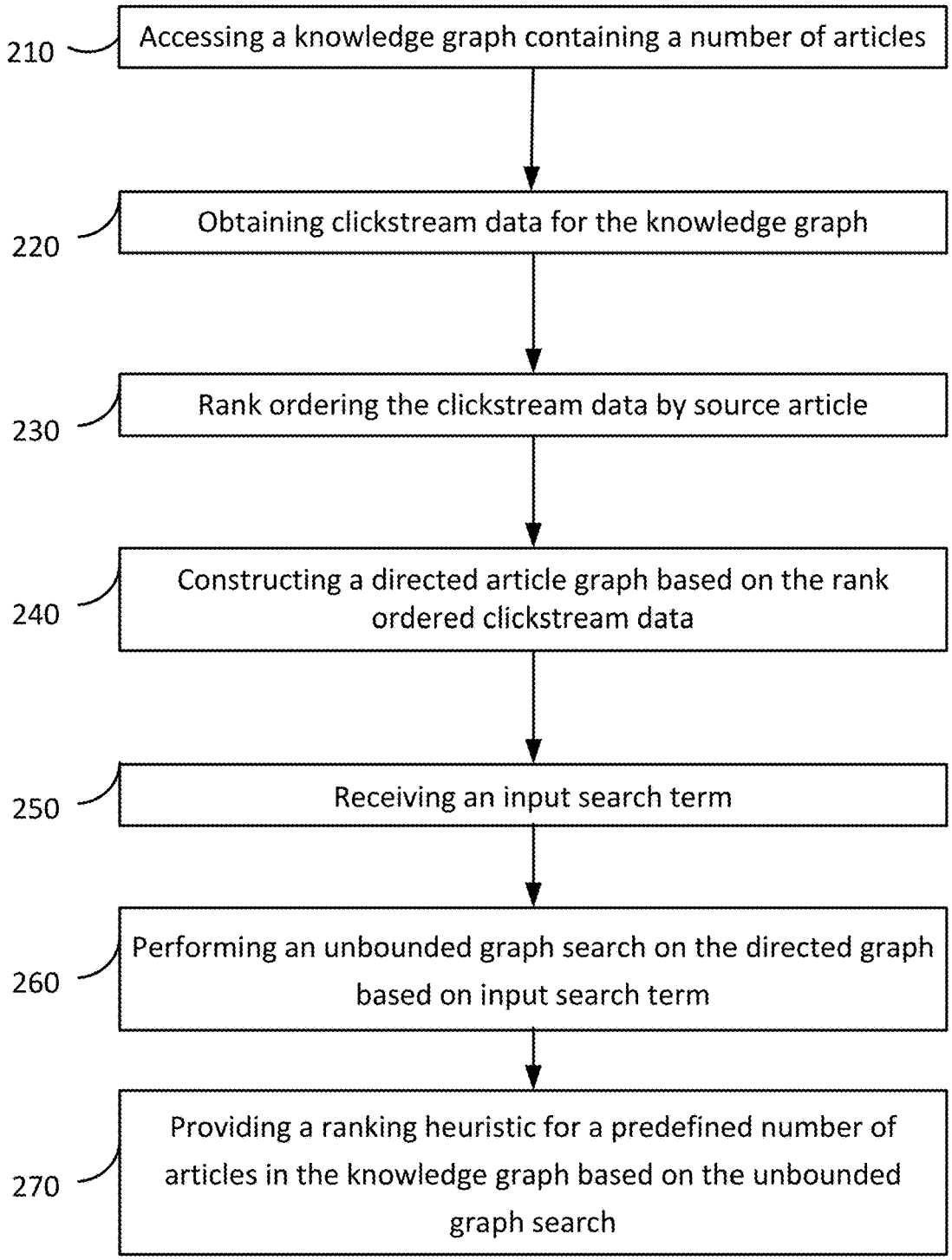
FIG. 2 illustrates a flow chart of a method for detecting topical similarities in knowledge databases, implemented in accordance with some embodiments.

FIG. 2 illustrates an example of a flow chart of a method for detecting topical similarities in knowledge databases, implemented in accordance with some embodiments. As discussed above, various components of system 100 may be configured to implement detecting topical similarities in knowledge databases.

At block 210, system 100 accesses a knowledge database comprising a plurality of articles. In some implementations, the knowledge database is knowledge database 116. In some implementations, the knowledge database is online, searchable, and publicly accessible. For example, Wikipedia is an open-source, free, online, publicly accessible knowledge database comprising millions of articles. In some implementations, system 100 accesses, searches, and retrieves content from the knowledge database via an application protocol interface (API) associated with the knowledge database. For example, Wikipedia is built with MediaWiki and associated with the MediaWiki API, which provides access to wiki features, data, and metadata. Other APIs and/or clients may connect to MediaWiki and Wikipedia, such as RESTBase and the Wikidata query service. In some implementations, records in the knowledge database can include entries, articles, terms, disambiguation pages, statistics, and/or clickstream data.

At block 220, system 100 obtains clickstream data for the knowledge database. In some implementations, system 100 obtains the clickstream data from the knowledge database 116 itself, topic similarity database 112, or another source. As the user clicks somewhere in the webpage or application, the action is logged on a client device or the web server. Clickstream analysis is useful for analyzing and learning about, for example, which links, images, and other content on a screen users are interested in. Clickstream data can be aggregated, that is, rather than information about each individual user's clicks, the data can be included in an aggregated total of clicks for users within a given period, such as a month.

Figure 3:
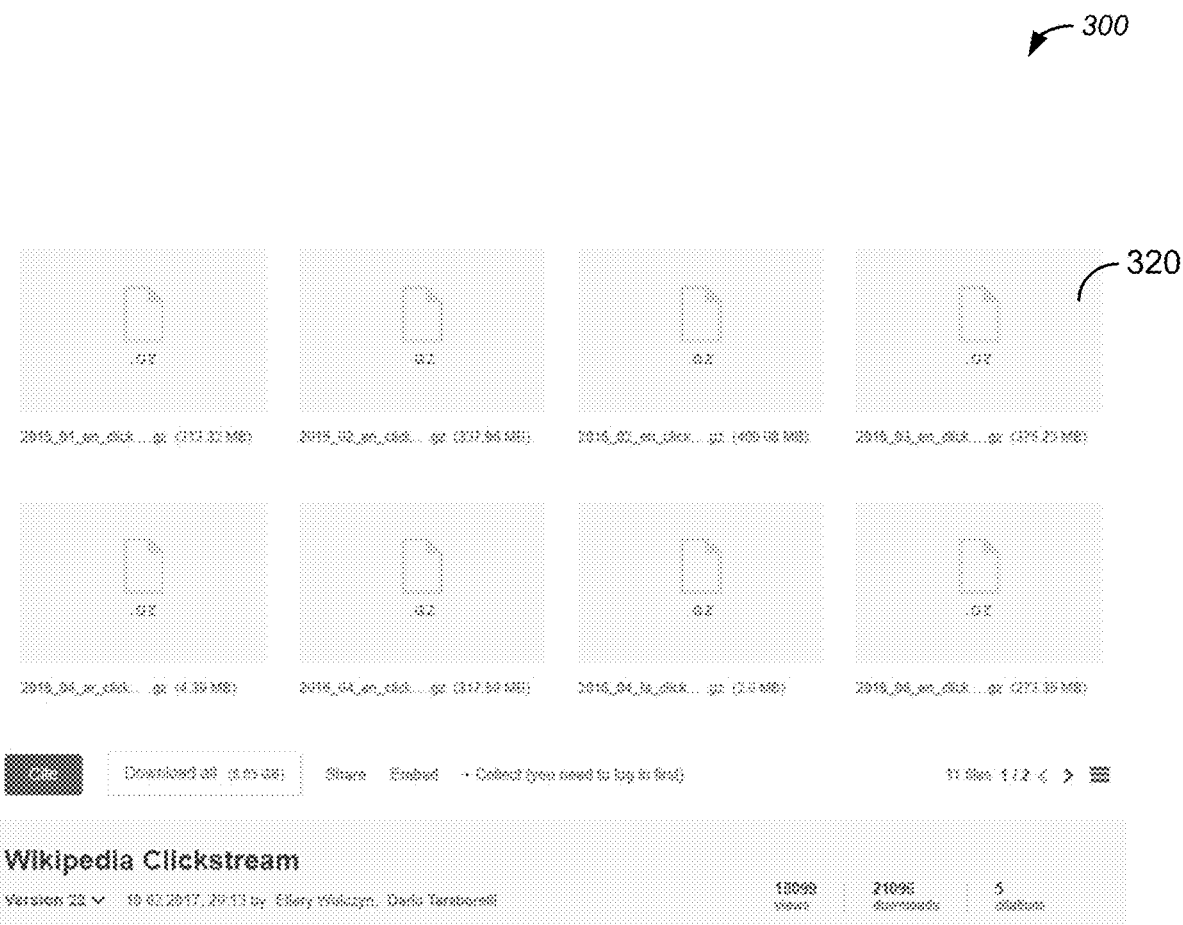
FIG. 3 illustrates an aggregated clickstream data repository, implemented in accordance with some embodiments.

FIG. 3 illustrates an example 300 of an aggregated clickstream data repository, implemented in accordance with some embodiments. In the example 300, a Wikipedia Clickstream is offered on a website. The clickstream includes 11 compressed archive files 320, each of which constitutes aggregated clickstream data for a given month. For example, the first file contains aggregated clickstream data for January 2015, the second file contains aggregated clickstream data for February 2015, and so on. In some implementations, system 100 may download, de-compress, store in a database, and/or utilize already downloaded clickstream data in various ways. In some implementations and examples, the clickstream contains data sets containing counts of {referrer, resource} pairs extracted from the request logs of the knowledge database. A referrer is an HTTP header field that identifies the address of the webpage that linked to the resource being requested. This data can show how users navigate to a particular entry in the knowledge database, and what links they click on. In other words, it provides a weighted network of articles, where each edge weight corresponds to how often users navigate from one page to another.

At block 230, system 100 sorts the clickstream data by source article. In some implementations, each source article corresponds to a plurality of target articles that the source article links to. Source articles are articles within the knowledge database which contains one or more links to other articles (target) within the knowledge database; target articles for those source articles, meanwhile, are the articles that are the destinations of those links. For example, the Wikipedia entry for "Tea" includes a number of links, including the links "Darjeeling", "*Camellia sinensis*", and "rooibos". In this case, the Wikipedia entry "Tea" would be a source article, and the linked entries "Darjeeling tea", "*Camellia sinensis*", and "Rooibos" would be target articles for the source article "Tea". In addition, target articles can themselves be source articles. For example, the target article "Rooibos" includes a number of links to other entries such as "ascorbic acid" and "Cederburg". Thus, "Rooibos" is also a source article in itself, and its corresponding target articles would include "ascorbic acid" and "Cederburg".

In some implementations, for the process of rank ordering by source article, each collection of a source article, s, and the set of corresponding target articles that it links to, $\{t_1^s, \ldots, t_{n_s}^s\}$, is called a group, $g_s$. This group can be represented as a tuple (s, $\{t_1^s, \ldots, t_{n_s}^s\}$). In some implementations, the clickstream data provides, for a given month, the number of users $c_i^s$ whom clicked on the corresponding target article $t_i^s$ while viewing source article s. In some implementations, for each group $g_s$, system 100 calculates the group total click count, which can be represented as:

$$C_s = \sum_{i=1}^{n} c_i^s$$

In some implementations, system 100 calculates the individual target count percentages, which can be represented as:

$$p_i^s = \frac{c_i^s}{c_s}$$

At block 240, system 100 constructs a directed article graph based on the rank ordered clickstream data. In some implementations, the nodes of the directed graph are source articles and target articles. In some implementations, the directed article graph is a weighted graph, which starts from a specific node (i.e., source article) of the graph, and constructs a tree of paths starting from that node and branching out to other nodes (i.e., target articles), expanding paths one step at a time.

Figure 4:
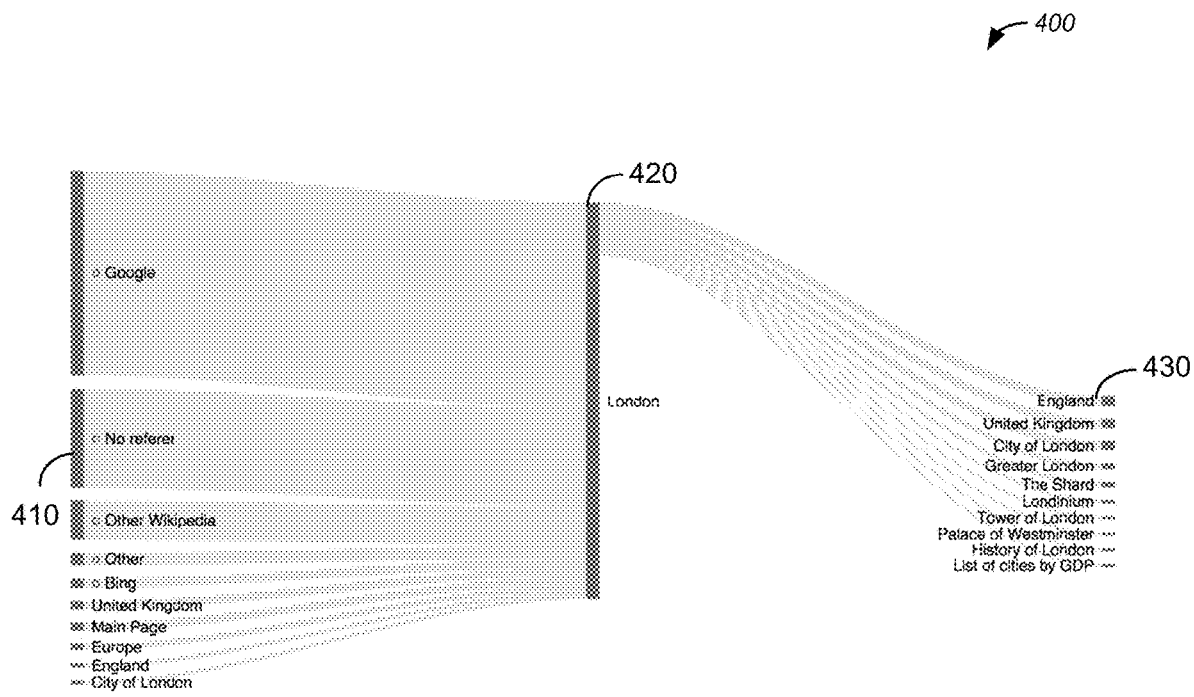
FIG. 4 illustrates an example diagram of referrers and clicks on outbound links, implemented in accordance with some embodiments.

One example of how the directed article graph is implemented within a knowledge database or graph can be seen in FIG. 4, which illustrates a diagram 400 of referrers and clicks on outbound links for the English Wikipedia article for "London". Referrers 410 are sources from which users have arrived at the knowledge database Wikipedia. Google is the main referral source by which users have arrived at this Wikipedia article. The source article 420 in this example is the Wikipedia entry "London" which contains a number of links in its content. Finally, clicks on outbound links 430 show a list of links within the entry "London" that users clicked on, in order of number of clicks. "England" was the link that most users clicked on, followed by "United Kingdom". Within the directed article graph, "England" and "United Kingdom" would in themselves be source articles, with a number of links represented as target articles.

Returning to FIG. 2, at block 250, system 100 receives an input search term via an input device. The input search term may be, for example, "London", "Tea", or "Fear". The input search term is provided in order to present a seed term by which exploration of the article graph can occur for topical similarity. In some implementations, system 100 can receive more than one input search term, or a document with several search terms in a structured or unstructured way. In some implementations, system 100 receives the input search term via one or more automated processes. Given an input search term, system 100 is configured to provide ranking or other heuristics which correlate topical similarity of the search term with articles in the knowledge graph.

At block 260, system 100 performs an unbounded graph search on the directed article graph (knowledge graph) based on the input search term. In some implementations, system 100 uses a modified, unbounded version of A*-search for exploring the article graph. In some implementations, the A* search is modified such that there is no goal node. In some implementations, system 100 associates with each vertex, $s_k$ (article), in the graph a heuristic cost, $h(s_k)$, defined as:

$$h(s_k) = \ln\left(1 - d(k)\prod_{j=1}^{k} p_{i_j}^{s_{j-1}}\right)$$

In this formula, $s_0$ is the starting node of the graph search corresponding to the knowledge base article most closely associated with the input search term. $\{s_0 \to s_1 \to \ldots \to s_k\}$ is the min-cost path from the starting node to $s_k$ and k is the length of this path. $p_{i_j}^{s_{j-1}}$ is the probability associated with the choice of target $t_i^{s_{j-1}} = s_j$ followed from $s_{j-1}$ in the min-cost path. Due to the increasing nature of the heuristic function, $$p_{i_j}^{s_{j-1}} = \max\{p_1^{s_{j-1}}, \ldots, p_{n_{s_{j-1}}}^{s_{j-1}}\}$$

In some implementations, d(k) is a decay function which serves to down-weight the scores of nodes at greater depths from the source. It can be defined as:

$$p(k) = e^{-\lambda k^3}$$

In some implementations, λ is a small constant. In some implementations, λ is set to 0.1. In some implementations, system 100 subtracts the weighted path probability from 1 and determines its log in order to address issues of numerical instability, which may arise when the un-dampened heuristic score rapidly approaches 0 as the depth of the search increases.

In some implementations, system 100 utilizes a min-priority queue to keep track of the fringe nodes of the search. In some implementations, following standard A*-search protocol, at each step of the algorithm system 100 dequeues the min-cost node in the fringe, $s_i$, retrieves its neighbors, $\{t_1^{s_i}, \ldots, t_{n_{s_i}}^{s_i}\}$, calculates their heuristic costs, and enqueues them into the min priority queue. In some implementations, system 100 specifies how many of each node's neighbors to enqueue into the fringe. The neighbors are retrieved in order of decreasing $p_j^{s_i}$, and increasing the number of neighbors to enqueue leads to a broader search, whereas decreasing the number of neighbors to enqueue leads to a deeper search. In some implementations, system 100 also specifies the number of terms the search should return, and breaks the A*-search loop once the correct number of nodes have been dequeued.

In some implementations, in addition to receiving an input search term from an input device, system 100 also receives an input from an input device which filters the algorithm's output based on the categories to which the articles belong. In some implementations, the input is a user-selected branch of the knowledge base's category tree. System 100 then traverses the category tree and keeps only those articles associated with the user-selected branch. This alleviates the potential problem in which many terms are ambiguated and have multiple articles associated with them. For example, the article for the emotion "Panic" is associated with an article for the popular band "Panic! at the Disco". The user-selected branch input and filtering can address this.

At block 270, system 100 provides a ranking heuristic for a predefined number of articles in the knowledge database. In a multitude of implementations the ranking heuristic is based on graph search, topical similarities of articles. In some implementations this ranking heuristic is based on the unbounded graph search as described at block 250. In some implementations, the ranking heuristic correlates to topical similarity of the articles to the input search term. The ranking heuristic correlates to topical similarity or is based on the unbounded graph search.

Examples of ranking heuristics include a numerical ranking, numerical rating of a set number of entries or articles, similarity percentage, graph, chart, table, and visual comparison. In some implementations, system 100 provides the ranking heuristic to one or more client devices. In some implementations, system 100 provides the ranking heuristic to one or more third party entities, or stores the ranking heuristic in one or more databases, such as the topic similarity database 112 or knowledge database 116. In some implementations, the ranking heuristic is provided to a mobile application, web application, desktop application, or other application.

FIG. 5 illustrates an example 500 of topical similarity rankings for received input terms, implemented in accordance with some embodiments. In the example 500, two tables for received input terms show ranking results denoting topical similarity to the input term compared to entries in the knowledge database. The first table 510 shows topical similarity rankings for the received input term "Tea". Based on the process as described above, the output for the topical similarity results reveals that the disambiguation page for "Tea" is the most similar to the input search term, followed by the entries "Tea" and "Tea (meal)" followed by "Oolong". The second table 520 shows topical similarity rankings for the received input term "Fear". The top rankings include the disambiguation page for "Fear", "Horror and terror", "Fear (1996 film)", and the disambiguation page for "Terror". As can be seen from the tables, the process picks up rank ordered lists of topics from artifacts not directly related to the search term, including science, medicine, music, film, art, popular culture, and higher-order topics.

Figure 6:
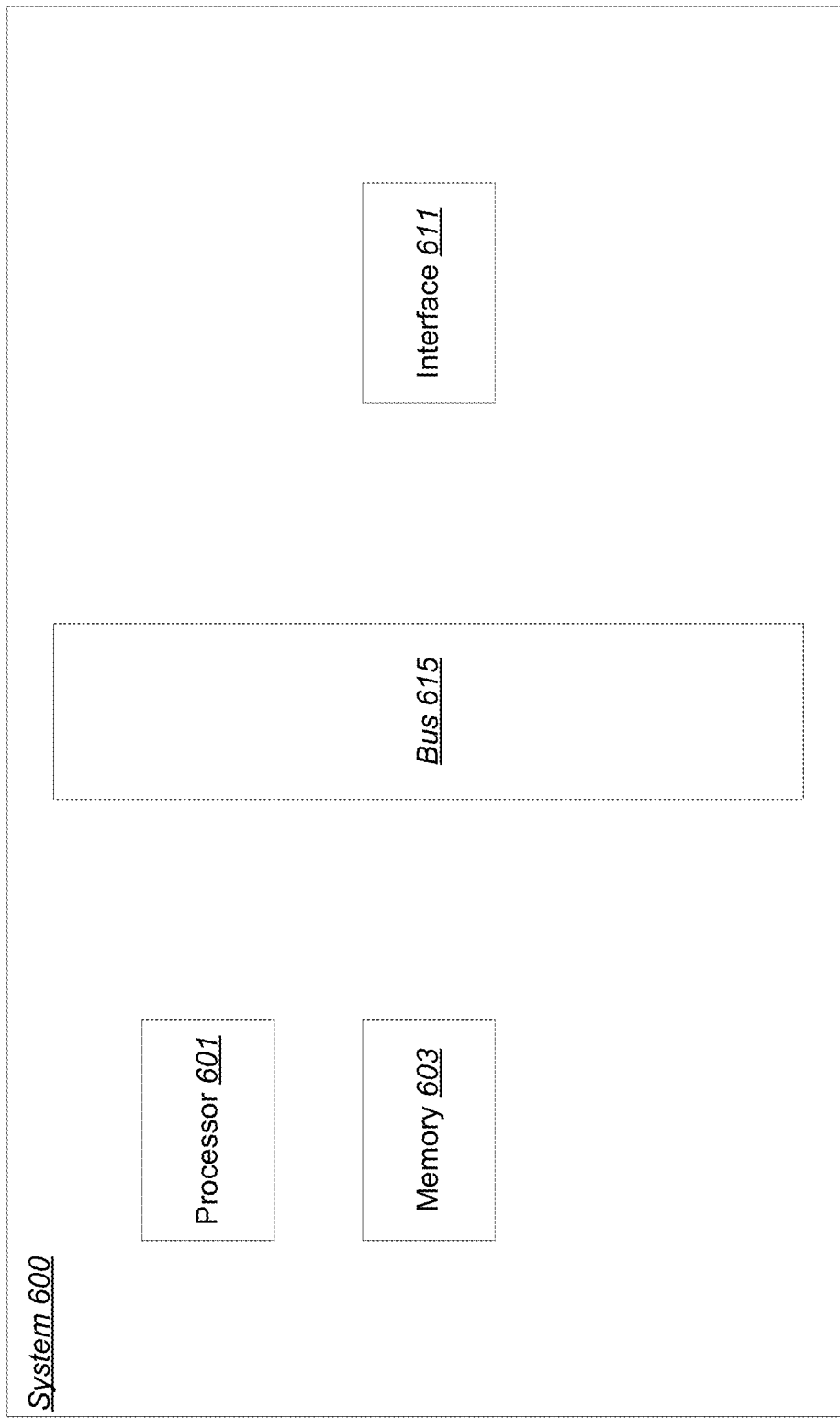
FIG. 6 illustrates an example of a computer system that can be used with various embodiments.

FIG. 6 illustrates an example of a computer system that can be used with various embodiments. For instance, the computer system 600 can be used to implement first processing device 104, second processing device 106, and/or controller 108 according to various embodiments described above. In addition, the computer system 600 shown can represent a computing system on a mobile device or on a computer or laptop, etc. According to particular example embodiments, a system 600 suitable for implementing particular embodiments of the present invention includes a processor 601, a memory 603, an interface 611, and a bus 615 (e.g., a PCI bus). The interface 611 may include separate input and output interfaces, or may be a unified interface supporting both operations. When acting under the control of appropriate software or firmware, the processor 601 is responsible for tasks such as closed loop control. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention. Moreover, although particular features have been described as part of each example, any combination of these features or additions of other features are intended to be included within the scope of this disclosure. Accordingly, the embodiments described herein are to be considered as illustrative and not restrictive.

What is claimed is:

1. A method of identifying topical similarities in a knowledge graph, comprising:
   accessing a knowledge graph having a plurality of articles;
   obtaining clickstream data for the knowledge graph;
   obtaining user preferences for the knowledge graph, wherein one manifestation of a user preference is a path-weighted preferential metric of user clicks on the knowledge graph;
   rank ordering, based on the clickstream data, a plurality of target articles that corresponds to a source article;
   constructing a directed article graph based on the rank ordered clickstream data, wherein nodes of the directed graph are source articles and target articles;
   receiving an input search term;
   performing an unbounded graph search on the directed article graph based on the input search term, wherein the unbounded graph search is an A* search with no goal node performed with a heuristic cost function, wherein a starting node of the unbounded graph search is the article most closely associated with the input search term, and wherein the heuristic cost function comprises a decay function configured to down-weight nodes at greater depths from the starting node; and providing a ranking heuristic for a predefined number of articles in the knowledge graph based on the directed graph search.

2. A method as recited in claim 1 wherein the ranking heuristic correlates to topical similarity of the articles to the input search term.

3. A method as recited in claim 1 wherein the rank ordered clickstream data shows previous paths users have taken in the unbounded graph.

4. A method as recited in claim 1 wherein rank ordered list of topics includes artifacts from higher-order topics.

5. A method of identifying topical similarities in a knowledge graph, comprising:
   accessing a knowledge graph having a plurality of articles;
   obtaining clickstream data for the knowledge graph;
   obtaining user preferences for the knowledge graph, wherein one manifestation of a user preference is a path-weighted preferential metric of user clicks on the knowledge graph;
   rank ordering, based on the clickstream data, a plurality of target articles that corresponds to a source article, wherein the rank ordering comprises:
      utilizing the clickstream data for the source article to determine, for each corresponding target article, a number of clickstream users for a predetermined period who clicked on a target article while viewing the source article;
      utilizing the clickstream data for the source article to derive a total click count of users who clicked on each corresponding target article from the source article;
      utilizing the clickstream data for each corresponding target article to determine target count percentages; and
      storing the number of clickstream users who clicked on the target article, the total click count of users who clicked on target articles, and the target count percentages;
   constructing a directed article graph based on the rank ordered clickstream data;
   receiving an input search term;
   performing an unbounded graph search on the directed article graph based on the input search term, wherein the unbounded graph search is an A* search with no goal node performed with a heuristic cost function, wherein a starting node of the unbounded graph search is the article most closely associated with the input search term, and wherein the heuristic cost function comprises a decay function configured to down-weight nodes at greater depths from the starting node; and
   providing a ranking heuristic based on the graph search.

6. A method as recited in claim 5 wherein target count percentages are determined by a number of clickstream users who clicked on the target article divided by the total click count.

* * * * *